United States Patent [19]

Robertson

[11] Patent Number: 4,956,916
[45] Date of Patent: Sep. 18, 1990

[54] CUTTING TOOL

[76] Inventor: Duane D. Robertson, 2601 Utica St., Denver, Colo. 80212

[21] Appl. No.: 234,680

[22] Filed: Aug. 22, 1988

Related U.S. Application Data

[60] Division of Ser. No. 12,291, Feb. 9, 1987, Pat. No. 4,789,189, which is a continuation-in-part of Ser. No. 834,960, Feb. 28, 1986, abandoned.

[51] Int. Cl.$^5$ ............................................. B23D 21/06
[52] U.S. Cl. .......................................... 30/92; 30/94; 30/300; 30/446; 408/26; 408/87
[58] Field of Search ...................... 30/92, 94, 300, 305, 30/310, 361, 354, 366, 367, 368, 443, 446, 447; 408/26, 68, 87, 92, 198

[56] References Cited

U.S. PATENT DOCUMENTS

1,746,463  2/1930  Elder ....................................... 30/300
4,413,413  11/1983  Romania et al. ....................... 30/300

Primary Examiner—Douglas D. Watts
Attorney, Agent, or Firm—W. Scott Carson

[57] ABSTRACT

A pipe saddle for providing a reliable connection to a pipe. The present invention uses a barb seal which embeds within the surface of the pipe to lock the pipe saddle in place and prevent leakage. The barb seal is formed from the material of the pipe saddle so that no deterioration occurs. The barb seal has an oval shape to provide better sealing capabilities. T-bolt connectors allow the device to be individually tightened on each side of the pipe while allowing the body portions of the saddle to be pivotally opened yet maintained as a single unit to allow easy implementation.

4 Claims, 4 Drawing Sheets

CUTTING TOOL

RELATED APPLICATIONS

This application is a division of U.S. patent application Ser. No. 12,291 filed Feb. 9, 1987, now U.S. Pat. No. 4,789,189, which is a continuation-in-part of U.S. patent application Ser. No. 834,960 filed Feb. 28, 1986, now abandoned.

BACKGROUND OF THE INVENTION

1. Field of Invention

The present invention pertains generally to plumbing systems and more particularly to pipe saddles for coupling an outlet to a pipe.

2. Description of the Background

Modifications of existing plumbing systems as well as easy adaptations to installation of new plumbing systems has normally been difficult to achieve. With the advent of new plastic materials available for use as plumbing fixtures, a wide range of adaptive systems have been developed. Prior to filing the present application, a patentability search was performed which disclosed the following patents:

| Inventor | U.S. Pat. No. | Issue Date |
| --- | --- | --- |
| Kiehle | 850,230 | Apr. 16, 1907 |
| Schlesch et al. | 3,258,822 | Jul. 5, 1966 |
| Anderson et al. | 3,280,846 | Oct. 25, 1966 |
| Turner | 3,432,188 | Mar. 11, 1969 |
| Malcolm | 4,389,441 | Jan. 13, 1970 |
| Smith | 3,891,247 | Jun. 24, 1975 |
| Blakeley | 3,999,785 | Dec. 28, 1976 |
| Francis | 4,158,461 | Jun. 19, 1979 |
| Blakeley | 4,391,458 | Jul. 5, 1983 |

U.S. Pat. No. 3,999,785 issued to Blakeley discloses a mechanical pipe outlet which uses plastic molded pieces having support ribs 46. Alignment key 36 interacts with the opening 37 to provide proper alignment. An internally threaded stand 13 is capable of receiving a stand pipe. Gasket 45 seals circularly around a preformed hole in pipe P. Spigot 41 formed on the mechanical outlet device 10 is inserted through the circularly shaped preformed hole and prevents misalignment. The enlarged surface area of flange portions 12 help to support pipe P. Flange portion 16 has a ridge on its outer surface to hold the bolt 14 in position. Surfaces 32a and 22a prevent the bolts from being tightened in a manner which would apply excessive pressure to the pipe. As disclosed in FIG. 8, one of the bolts must be removed to allow the mechanical pipe outlet to pivot and engage pipe P. Gasket 45, as illustrated in FIG. 9, is essentially a round gasket made of a flexible material.

U.S. Pat. No. 850,230 issued to Kiehle on Apr. 16, 1907 discloses a pipe connection device which uses a flexible gasket 6 disposed between two ridges 4 and 5. The two rdiges 4 and 5 help hold the gasket in place and prevent blow out of the gasket. Flexible material can comprise a suitable packing such as lead, leather, rubber or other suitable material which is deformable in nature. The gasket and ribs have a substantially circular shape, as illustrated in FIG. 1.

U.S. Pat. No. 3,891,247 issued Jun. 24, 1975 to Smith discloses a plastic one-piece saddle for a plastic pipe which employs a gasket 34. As illustrated in FIGS. 2 and 3, gasket 34 has pressure applied to it from the internal portion of the pipe via outlet 32. Gasket 34 is formed in a substantially circular shape.

U.S. Pat. No. 3,280,846 issued Oct. 25, 1966 to Anderson et al. discloses a water and corporation clamp which uses a pivotal toggle connector 20. Gasket 70 is deformable and has a substantially circular shape, as illustrated in FIG. 1.

U.S. Pat. No. 3,258,822 issued Jul. 5, 1966 to Schlesch et al. discloses a pipe clamp having a key insert 26 which allows pivotal interconnection upon removal of bolt 22. A stop, as illustrated in FIG. 4, prevents overtightening of bolts 24.

U.S. Pat. No. 3,432,188 issued Mar. 11, 1969 to Turner discloses a plastic pipe saddle having a lip 52 which extends into a preformed hole to hold the pipe saddle in position. The device of Turner is designed to grip the pipe so that frictional locking forces are well distributed along the saddle and are fully adequate to hold the saddle in position and provide adequate sealing without cracking or distorting the pipe.

U.S. Pat. No. 3,489,441 issued Jul. 13, 1970 to Malcolm discloses a saddle fitting for conduits which is connected by a pair of screws 55 that protrude through flange portions 22, 52. The Malcolm disclosure is directed to the positioning of the gasket to provide proper sealing.

U.S. Pat. No. 4,158,461 issued Jun. 19, 1979 to Francis discloses pipe tapping bands having a gasket illustrated in FIGS. 3, 4 and 5 with a predetermined shape which allows proper sealing.

U.S. Pat. No. 3,471,176 issued to Gilchrist on Oct. 9, 1969 discloses a tapping saddle which uses a dual lip gasket 30 having a base lip 32 and a compression lip 34. Compression lip 34 is compressed inwardly upon placement of the pipe, as illustrated in FIG. 2. Gilchrist also discloses a bolt shank 40 having a T-extension 42 which is rotatably fitted in compression housing 54.

U.S. Pat. No. 4,391,458 issued Jul. 5, 1983 to Blakeley discloses a pipe coupling device which uses a split ring gasket disposed in a split housing. The abutting ends of the gasket are offset from the splitting of the housing to prevent leakage. Blakeley discloses a hinge device 44 which is fixed in combination with a releasable locking means 45 to engage slot 48.

It is clear from these references that it is advantageous to have a pipe saddle which is capable of providing a highly reliable seal and which is durable and can withstand high pressure and will not deteriorate. All of the above references disclose flexible seal materials which are subject to deterioration, blow out and leakage due to loss in elasticity. Additionally, flexible seals do not provide alignment with the opening formed in the pipe.

It is also advantageous to have a pipe saddle which is adaptable to a wide range of outer diameters of the pipe. The fixed hinge devices, such as disclosed in the Schlesch et al., Anderson et al., Gilchrist and Blakeley (U.S. Pat. No. 4,391,458) patents are all adapted for use with a pipe having a single outer diameter. Many present day plastic type pipes have different outer diameters, for the same inner diameter, to accommodate different pressure ratings. Consequently, such devices using fixed hinges would necessarily require a different fitting for each different pressure rating of a pipe having the same inner diameter.

It is also advantageous to maintain the location of the pipe saddle on the pipe after it is tightened. Leverage forces on stand pipes connected to the pipe saddle after installation, as well as expansion and contraction effects and creep induced in the pipe as a result of changing temperatures, can cause the pipe saddle to move relative to the pipe. This can cause leakage between the gasket and the pipe, as well as misalignment of the pipe saddle with the hole formed in the pipe. Conventional pipe saddles do not disclose any means for overcoming these problems.

Additionally, it is advantageous to maintain the location of the pipe saddle on the pipe during tightening. Again, the fixed pivotal devices will cause the gasket to move laterally on the pipe during the tightening process which may cause misalignment and an ineffective seal.

It would also be advantageous to have a pipe saddle that could be quickly installed on the pipe so as to reduce the installation time. Many of the devices illustrated in the prior art require disassembly of various parts of the pipe saddle and reassembly in position on the pipe. Not only does this require additional installation time, but also results in the loss of pieces during installation. Rather, it would be advantageous to employ a single unit type system which does not require separation and disassembly of various parts of pipe saddle for installation around the pipe.

It would also be advantageous to provide a means for cutting through plastic pipes in a simple and easy manner with a tool which does not produce any residue in the pipe that could cause blockage of the pipe. Current cutting tools produce a substantial amount of residue which can block attachments to the pipe such as sprinkler heads. Other devices such as heating or melting devices require a source of power for operation. These devices also require a substantial amount of time to reach a suitable temperature for use. Lack of availability of power in certain locations, as well as the added expense and time of coupling to a power supply, makes these types of systems impractical. Portable heating systems are expensive and require a significant amount of time to obtain a suitable temperature for use which greatly delays the installation process. Also, these devices may produce residue which impedes the flow of fluid through the pipe.

It is also advantageous to have a cutting tool which is safe to use and does not have any exposed portions which could injure the user.

It is also advantageous to have a pipe saddle which will not leak if the pipe becomes kinked or bent at the edge of the pipe saddle. Frequently, during installation of such systems, the pipe will be bent sufficiently to cause a kink at the edge of the pipe saddle. This causes depression of a portion of the pipe on the interior surface of the pipe saddle which can cause leakage around the gasket. Prior art devices have failed to prevent leakage from depression of the pipe in this manner.

It is also advantageous to have a pipe saddle which is capable of maintaining a seal due to inward and outward contraction and expansion of the pipe as a result of changing temperatures. Prior art devices have not disclosed any means for providing a predetermined flex tension in the pipe saddle to compensate for inward and outward contraction and expansion to maintain the seal. Prior art devices tend to leak because of a lack of tension resulting from expansion and contraction of the pipe due to changes in temperature which tends to loosen the pipe saddle on the pipe. Multiple cycles of expansion and contraction due to varying temperatures will readily induce leaks in prior art devices.

SUMMARY OF THE INVENTION

The present invention overcomes the disadvantages and limitations of the prior art by providing a novel and unique pipe saddle. The pipe saddle of the present invention utilizes a barb seal which is formed from the material of the pipe saddle and which has a hardness which is substantially equal to or greater than the material of the pipe. The barb seal has a shape and surface area which causes the barb seal to embed into the pipe to lock the pipe saddle and seal in place on the pipe in alignment with the hole formed therein. The barb seal is not subject to deterioration since it is formed from the material of the saddle and is capable of withstanding high pressures. The present invention provides an even better seal as pressure increases within the pipe, since the pipe tends to expand and cause the seal to embed into the pipe to an even greater extent. Moreover, the barb seal of the present invention is formed in an oval shape such that downward pressures on the pipe along horizontal surfaces are removed a distance from the hole formed in the pipe to provide more support for the barb seal. Vector components of pressures induced by the connector means of the pipe saddle are greater in a downward direction. The barb seal is removed a distance from the hole formed in the pipe along horizontal portions of the surface of the pipe to allow greater support structure to counteract the increased vector components of force in the downward direction and allow the barb seal to more readily embed in the pipe rather than deflect the pipe.

The body portions of the pipe saddle of the present invention extend from the edge of the barb seal a length which is greater than the length of depression of the pipe caused by a kinking or bending of the pipe. Consequently, if the pipe is bent or kinked at the edge of the pipe saddle, the depression caused by the bending or kinking will not extend to the barb seal. The present invention also uses T-bolt connectors which extend in an lengthwise direction to allow the body portions of the pipe saddle to adapt to different outer diameter pipes. Consequently, a different pipe saddle does not need to be designed for each pipe having a different outer diameter. The T-bolt connectors of the present invention also allow the body portions to be evenly tightened on both sides of the pipe to prevent creep or movement of the seal during tightening, providing a more reliable and tighter seal. Also, since both T-bolts hinge, the pipe saddle can be maintained as a singular unit which can be easily placed on the pipe without assembly and disassembly of the parts. Since the T-bolts are frictionally fit into the body portions, the pipe saddle is double hinging and kept as a single unit to further aid in assembly and installation.

The flanges of the present invention are connected to the body portion by way of support ribs which transfer the pressure to the body portions of the pipe saddle. These flanges extend a sufficient distance to provide a predetermined flex tension, or spring tension, to maintain a seal during cyclical expansion and contraction of the pipe. Additionally, protuberances are provided on the outer portions of the flanges which transfer pressure inward towards the pipe as the nuts are tightened on the T-bolt connectors to ensure pressure is applied to the pipe, rather than merely outwardly deflecting the flanges which can cause the T-bolt to slip off of the flange. Also, retaining lips are provided on the edge of the flange to prevent the T-bolts from unscrewing or sliding off of the flanges.

BRIEF DESCRIPTION OF THE DRAWINGS

An illustrative and presently preferred embodiment of the invention is shown in the accompanying drawings wherein:

FIG. 8 is a view similar to FIG. 3 illustrating one mode of operation.

FIG. 9 is a view similar to FIG. 8 illustrating a second mode of operation.

DETAILED DESCRIPTION OF THE PREFERRED EMBODIMENTS

Figure 1:
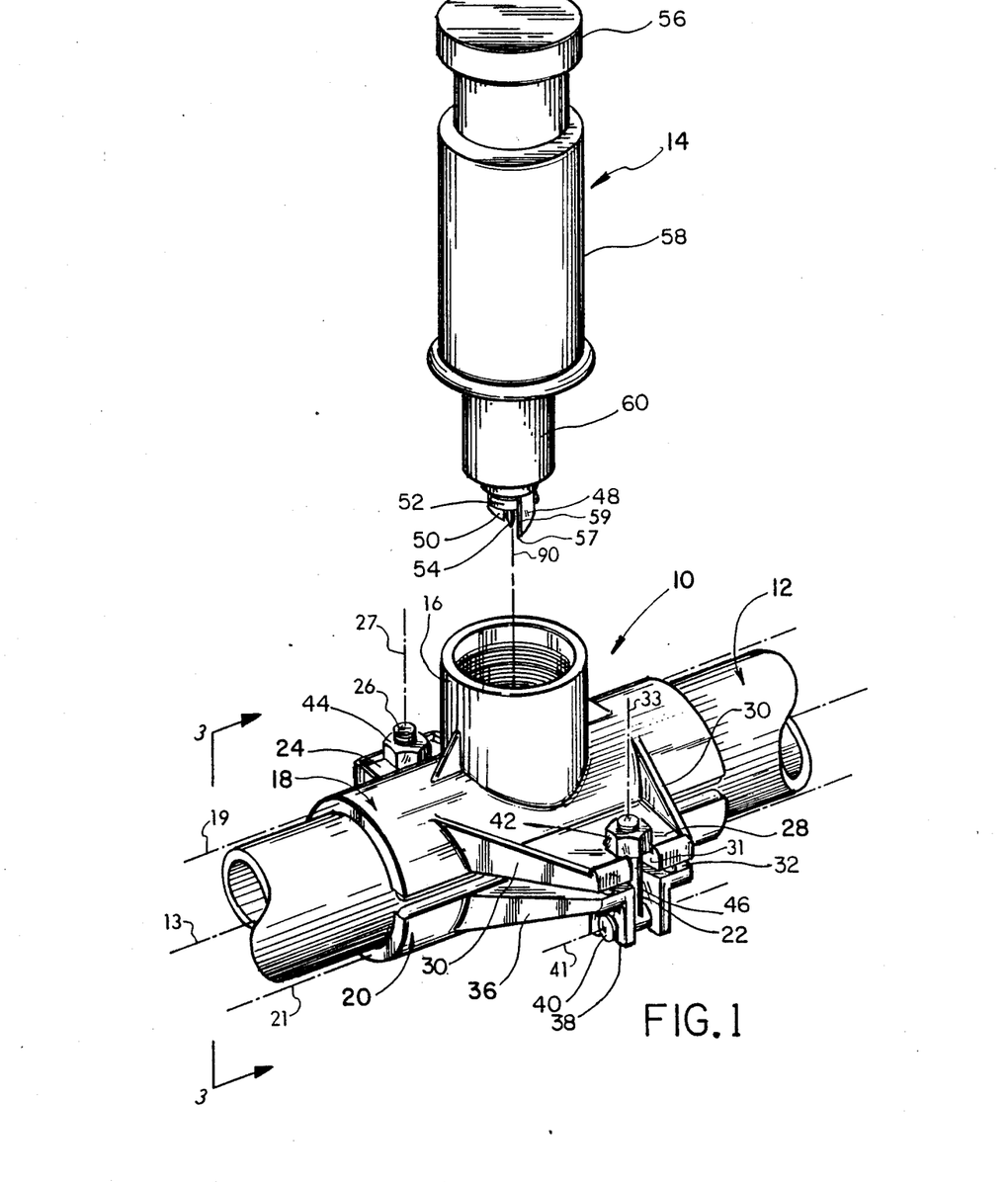
FIG. 1 is a schematic perspective view of the pipe saddle of the present invention disposed on a pipe and the cutting tool of the present invention.

FIG. 1 is a schematic perspective view illustrating one embodiment of the pipe saddle device 10 of the present invention which is disposed on pipe 12. Cutting tool 14 is aligned with stand connector 16 of pipe saddle 10 and is adapted to be disposed in the opening of stand connector 16 to form a hole in pipe 12. The pipe saddle 10 has a first body portion 18 having an arcuate shape with an inner, arcuate surface 13 (see FIG. 2) with a diameter substantially the same as the outer diameter of pipe 12. Similarly, second body portion 20 has an arcuate shape with an inner, arcuate surface 15 which has a curvature substantially the same as the outer diameter of pipe 12. First body portion 18 has opposing flange means 24 and 28 connected to it which are disposed on opposite sides of first body portion 18 and which extend in a direction substantially normal to the arcuate shape of the first body portion 18. The first flange means 24 has a closed slot 29 (see FIG. 2) formed therein through which T-bolt connector means 26 is disposed. Flange means 28 has an open slot 31 formed therein through which T-bolt connector means 22 is disposed. Support ribs 30 connect the first opposing flange means 24 and 28 to first body portion means 18.

Second body portion means 20 has opposing flange means 32 and 34 (FIG. 2) connected to it which extend in a direction substantially normal to the arcuate shape of the second body portion 20. Support ribs 36 connect the opposing flange means to second body portion means 20 and function to transfer forces from the second opposing flange means 32 and 34 to second body portion 20. T-bolt connector means 22 and 26 are disposed in friction fit slots 38 which are coupled to the opposing flange means 32 and 34. Friction slot means 38 permits the horizontal head portion 40 of T-bolt connector 22 to rotate in a direction about axis 41 which allows T-bolt connector 22 to disengage the open slot 31 formed in flange means 28. T-bolt connector 26 has a similar horizontal head portion 40 which allows the pipe saddle 10 to hinge into the open position illustrated in FIG. 2. Since the T-bolt connectors 22 and 26 are frictionally fit into slot means 38, disassembly of the pipe saddle 10 is not required to disengage pipe 12. In other words, the pipe saddle 10 can be opened with a double hinging action of T-bolt connectors 22 and 26 to disengage pipe 12, in the manner illustrated in FIG. 2, and remain as a single unitary device which does not require disassembly of any pieces which could be lost. T-bolt connector means 22 and 26 have threaded shafts which engage nuts 42 and 44. Consequently, the opening provided by the inner surfaces 13 and 15 of body portion means 18 and 20 can be adjusted by adjusting the position of nuts 42 and 44 on the threaded shafts of T-bolt connectors 22 and 26. This allows the saddle-T device to be used with a large number of different pipes having different outer diameters. The barb seal 66 of the present invention can be seated evenly on pipe 12 by evenly adjusting nuts 42 and 44 so as to prevent leakage. Additionally, retaining lip 46 is disposed on flange 28 which prevents the nut 42 from unscrewing and sliding off of flange means 28.

Figure 2:
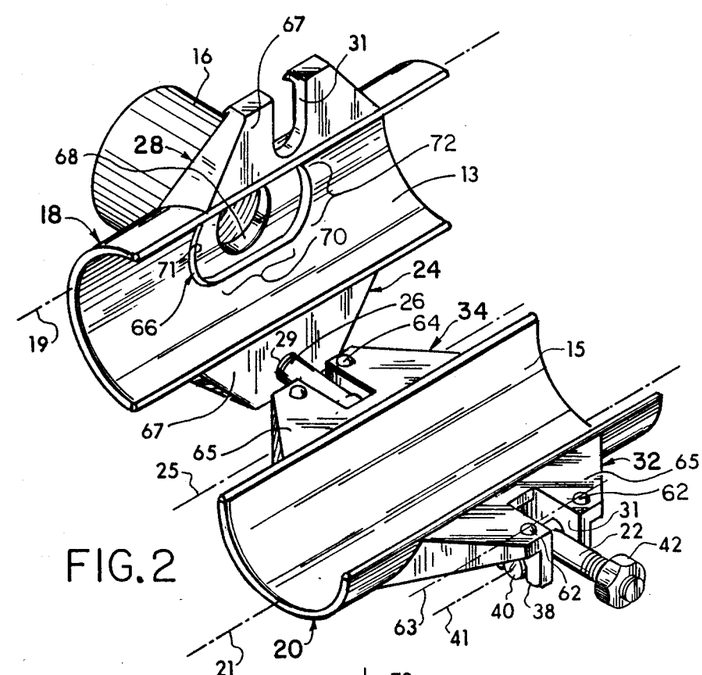
FIG. 2 is a schematic perspective view of the pipe saddle of the present invention in an open position.

As shown in FIGS. 1 and 2, each of the body portions 18 and 20 extends respectively along a longitudinal axis 19 and 21 essentially parallel to the longitudinal axis 13 of the pipe 12. Additionally, each body portion 18 and 20 has a pair of flange members connected to it (24 and 28 in the case of body portion 18 and 32 and 34 in the case of body portion 20). As shown, these pairs of flange members 24 and 28 and 32 and 34 are connected to the respective body portions 18 and 20 on opposite sides thereof relative to the longitudinal axes 19 and 21. The shaft of the T-bolt or retainer means 26 as shown extends along an axis 27 which is substantially perpendicular to the longitudinal axis 21 of the portion 20. The head 40 of the T-bolt 26 as discussed above pivotally mounts the two body portions 18 and 20 to each other for pivotal movement about the pivotal axis 25 (see FIG. 2). This pivotal axis 25 is fixed relative to the portion 20 (see FIGS. 1-3) and is also substantially parallel and fixed relative to the longitudinal axis 21 of body portion 20. As discussed above, the nut 44 on T-bolt 26 can be tightened to draw the flanges 24 and 34 together along the retainer axis 27 and the overall operation of the connector means between the flange members 24 and 34 enable the portions 18 and 20 to be pivotally opened relative to each other (see FIG. 2) yet maintained together at the same time as a singletary unit.

Figure 3:
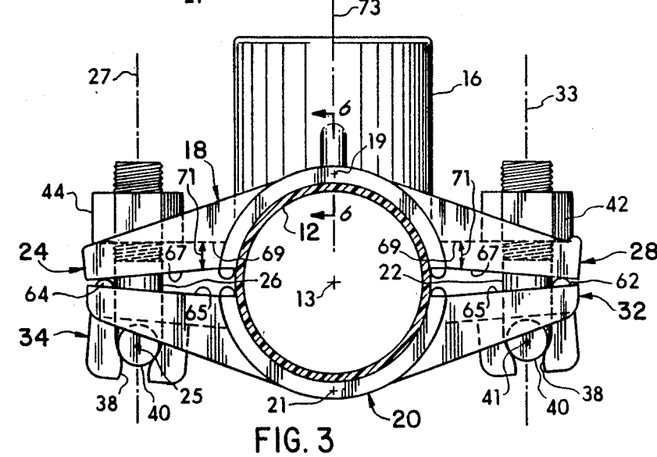
FIG. 3 is a schematic side elevation view of the flange portions and connector means of the present invention taken along line 3—3 of FIG. 1.

The second connector means 22 as best seen is FIGS. 1-3 is similar to the first connector means 26. Like the first connector means 26 as shown in FIG. 3, the head 40 of the T-bolt is frictionally maintained in a slot 38 for pivotal movement about an axis 41. However, unlike the first connector means 26, the shaft of the second connector means 22 is selectively received in the open slot 31 of flange member 28 (see FIGS. 1 and 2) rather than a closed slot like 29 as in flange member 24. In this manner and as discussed above, the body portions 18 and 20 can be opened relative to each other (FIG. 2) by moving them about the pivotal axis 25 defined by the head 40 of the T-bolt 26. In doing so, the body portions 18 and 20 are maintained together as a singletary unit for easy handling and assembling. Additionally, as discussed above and as shown in FIG. 2, the T-bolt 22 is frictionally maintained at its head 40 in the slot 38 of the flange 32 when the pipe saddle 10 is opened so that even the T-bolt 22 remains part of the singletary unit. In this manner, all of the parts of the saddle 10 remain linked together. Once opened, the body portions 18 and 20 can be positioned about the pipe 12 (FIG. 1) with the shaft of the T-bolt 22 pivoted about the axis 41 and received in the open slot 31 on flange 28. Each of the retaining means of T-bolts 22 and 26 and nuts 42 and 44 can then be individually tightened (see FIG. 3) to respectively draw flanges 24 and 34 together along axis 27 as desired as well as to draw flanges 28 and 36 together along axis 33 as desired to best fit on the pipe 12.

FIG. 2 is a schematic perspective view of the pipe saddle 10 of FIG. 1 illustrated in an open position. As shown, the flange members 32 and 34 have protuberances 62 and 64 located on the surfaces 65 thereof. The protuberances 62 and 64 extend upwardly beyond the surfaces 65 toward the respective facing surfaces 67 (see FIG. 3). The protuberances 62 as illustrated are spaced from one another along the axis 63 (see FIG. 2). Additionally, they are located on a portion of the surface 65 of flange member 32 that extends outwardly or to the right of the retainer axis 33 relative to the body portions 18 and 20 (see FIG. 3). Similarly, the protuberances 64 are located on a portion of the surface 65 of flange member 34 that extends outwardly or to the left of the retainer axis 27 relative to the body portions 18 and 20. In this manner and first referring to the flange members 28 and 34 on the right side of FIG. 3, the facing surfaces 65 and 67 will be drawn toward each other by tightening nut 42 until surface 67 contacts the protuberance 62 (see FIG. 8). Protuberance 62 then acts as a pivot to cause the flange members 28 and 32 and attached, spaced-apart body portions 18 and 20 and flange members 24 and 34 (see FIG. 8) to pivot toward each other (see arrows 75 in FIG. 8). In the preferred embodiment, there are two protuberances 62 and the pivoting action is about the axis 63 (see FIG. 2) of the protuberances 62 as the nut 42 is further tightened. This action can then be continued until the flange members 24 and 34 contact one another at protuberances 64 whereupon continued tightening of the nut 42 will cause the flexible, plastic flange members 28 and 32 to flex and pivot even further (see arrows 75 in FIG. 9). This then causes the body portions 18 and 20 to pivot further about the pivotal axis 63 of the protuberances 62 and move closer together to apply more pressure on the pipe 12.

FIG. 3 also illustrates how the planar surface 69 on the flange member 28 is inclined at an acute angle 71 to the planar surface 67. As shown, the acute angle 71 on flange 28 opens outwardly or to the right in FIG. 3 away from the longitudinal axis 19 of the body portion 18. In this manner and in the configuration of FIG. 3, the lower surface of the nut 42 will abut the surface 69 as the nut 42 is drawn tight. Then, because the surface 69 is inclined downwardly toward the body portion 19, it will help maintain or at least bias the axis 33 of the shaft 22 to the left in FIG. 3 about the axis 41 toward body portion 19 as the nut 42 is tightened and will not tilt the axis 33 outwardly or to the right in FIG. 3 which might cause the bolt 22 and nut 42 to become disengaged from the flange member 28. The flange member 24 has a similar surface 69 which also helps to maintain the axis 27 of the shaft 26 vertical or even slightly inclined inwardly toward the body portion 18 as nut 44 is tightened.

Figure 6:
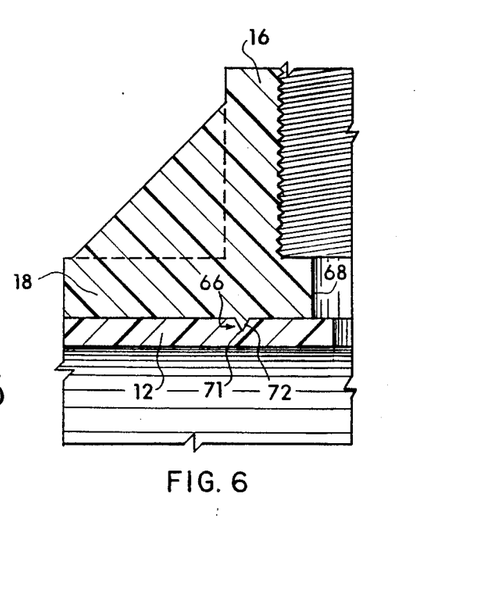
FIG. 6 is a cross-sectional view taken along line 6—6 of FIG. 3 illustrating the manner in which the barb seal is embedded into the pipe.

Referring again to FIG. 2, barb seal 66 is disposed on the inner arcuate surface 13 of the first body portion means 18 and is formed from the same material as the first body portion means 18 in an integral molding process. Barb seal 66 has a relatively sharp, knife edge 77 (see FIG. 6) extending about the axis 73 of the hole 68 (compare FIGS. 2, 3, and 6). The axis 73 is substantially perpendicular to the longitudinal axis 19 of the body portion 18. The knife edge 77 (see FIG. 6) allows the seal 66 to embed in the pipe 12 and lock the seal 66 in position to prevent movement. Since the barb seal 66 is an integral part of the first body portion means 18, it will not deteriorate or move relative to body portion 18 as does standard gasket material. Additionally, barb seal 66 is capable of withstanding very high pressures and provides an even greater sealing ability as pressures increase within the pipe causing the pipe 12 to expand and further embed the barb seal 66. Barb seal 66 also has an oval or elongated shape in the direction of the longitudinal axis 19 of the body portion 18 with side portions 70 located closer to opening 68 than end portions 72. This structure is important and advantageous because when the hole 68 in FIG. 2 is cut in the pipe 12 with the tool 14, the wall of the pipe 12 deforms and is depressed more along the axis 19 than laterally across the pipe. Consequently, the wall of the pipe 12 outwardly of the hole 68 is often deformed and weakened along the axis 19 and often does not return fully to its original position. In this light, the structure of elongating the barb seal 66 in the direction of the longitudinal axis 19 (see FIG. 2) will then form a better seal than prior devices. This is true since the end portions 72 of the elongated shape are spaced farther from the hole 68 and preferably beyond any remaining depression or deformation of the pipe 12 that occurred when the hole 68 was cut. Also, the body portion 18 is attached to the pipe 12 and tightened to embed the barb seal 66 into the pipe 12 by structure extending exteriorly about the pipe 12. In this manner, the seal 66 is embedded without having any portion of the attaching means physically extending into the interior of the pipe 12 to obstruct the flow or pinch the wall of the pipe 12. Additionally, the vector component of forces induced by the T-bolt connectors 22 and 26 are greater in a downward direction, as illustrated in FIG. 3, than in an inward direction. Consequently, greater support is provided by the nondeformed sidewalls of the pipe along the longer side portions 70 of the barb seal than the lateral portions of the pipe which are aligned with end portions 72 of barb seal 66. Further, a better seal is provided if the end portions 72 of barb seal 66 are separated to some extent from the weakened structure of the pipe adjacent the hole.

Figure 4:
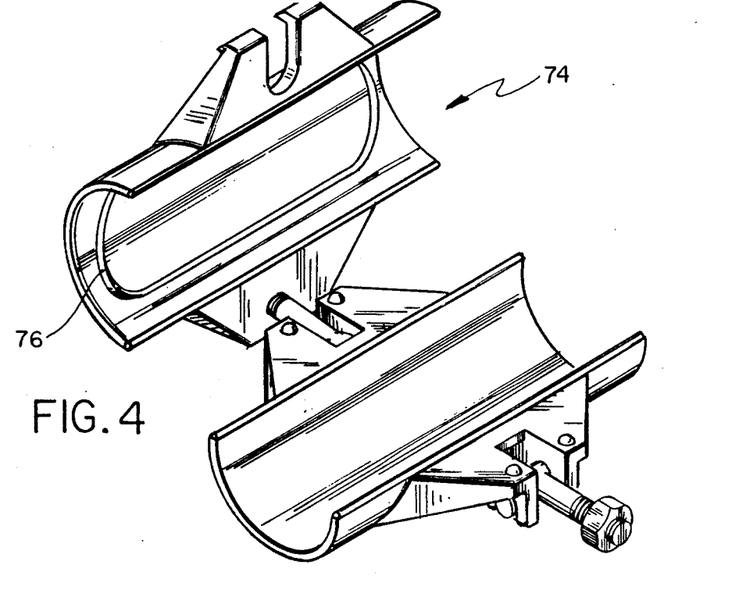
FIG. 4 is a schematic view of the pipe saddle of the present invention employed as a repair device for pipes.

FIG. 4 discloses an alternative embodiment 74 of the pipe saddle of the present invention. Pipe saddle 74 is used as a repair device for kinks or openings which have formed in the pipe. Barb seal 76 has an elongated structure to encompass a large surface area on the pipe in which a hole must be sealed. Consequently, there is no opening, such as opening 68 of FIG. 2, and there is no stand connector, such as stand connector 16, illustrated in FIG. 1. The remaining portions of the embodiment of FIG. 4 are essentially the same as the structure illustrated in FIGS. 1 through 3.

Figure 5:
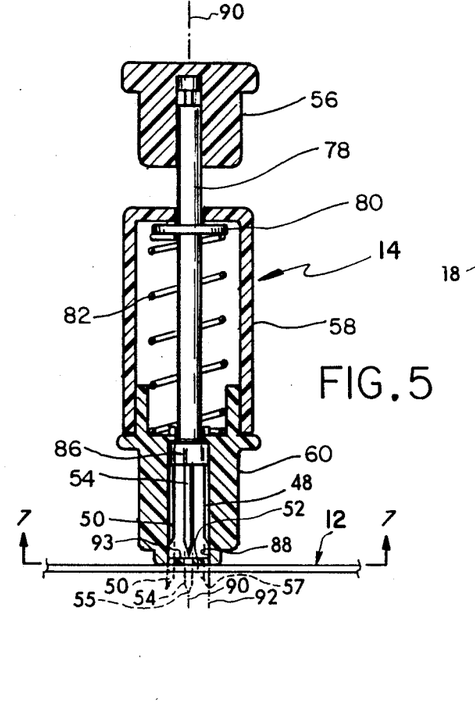
FIG. 5 is a cross-sectional view of the cutting tool of the present invention.
Figure 7:
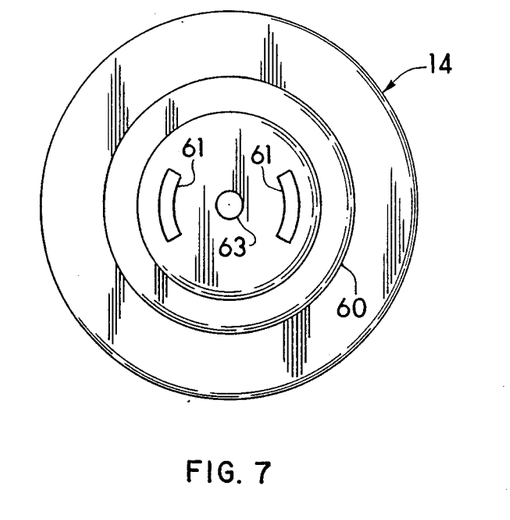
FIG. 7 is an end view of the cutting tool taken along line 7—7 of FIG. 5 showing the cutting blades and prong member retracted into the housing of the tool.

Cutting tool 14 in FIG. 1 is illustrated after a hole has been cut in pipe 12 and the tool has been removed from stand connector 16. Blades 48 and 50 are shown in an extended position with residue portion or plug 52 impaled on retaining prong 54. After the cutting tool 14 has been removed from stand connector 16, the handle portion 56 can be pulled outwardly relative to housing means 58 to cause the residue 52 to be removed from prong 54 between blades 48 and 50. The lower portion 60 of housing means 58 is adapted to fit into the interior diameter of stand connector 16 with minimal play so as to center the cutting tool 14 within the stand connector 16. In this manner, the hole formed in pipe 12 is also centered in stand connector 16. More specifically, the prong 54 extends along an axis colinear with the central axis 90 of the handle portion 56 and has a pointed end 55 (see FIG. 5) for penetrating the pipe 12. As shown, the pointed end 55 faces downward or in the direction of the axis 90. The blade 48 like prong 54 has a pointed end 57 to facilitate penetration into the pipe 12 but it also has a cutting knife edge 59 (see FIG. 1). This knife edge 59 faces in a direction substantially perpendicular to the longitudinal axis 92 (see FIGS. 1 and 5) of the blade 48. The longitudinal axis 92 as shown in FIG. 5 is parallel to and spaced from the central axis 90 wherein handle portion 56 can be manipulated to have the pointed end 55 of the prong 54 and the pointed end 57 of the blade 48 penetrate the pipe 12 (see FIG. 5). Thereafter, the handle portion 56 can be rotated about the central axis 90 to radially advance the knife edge 59 through the pipe 12 about the central axis 90 to cut out the plug 52. Once the plug 52 is cut, the handle portion 56 can be further manipulated away from the pipe 12 with the plug 52 remaining impaled on the prong 54 and not falling inside the pipe 12. The relative movement of the handle portion into its retracted position (solid lines in FIG. 5) will then cause the plug 52 to abut against the end portion 93 of the housing 14 to cause the plug 52 to be removed from the prong 54. The blade 50 works in an identical manner and as shown in FIG. 7, both blades 48 and 50 extend radially about the central axis 90 for less than 90°. That is, the blades 48 and 50 pass through the slots 61 in the housing 14 and like the prong 54, both blades 48 and 50 are safely received in the housing 14 through the radially arcuate slots 61 (see FIG. 7) in the end wall 93 in the retracted position. As also shown in FIG. 7, the prong 54 is retracted through the central hole 79 in the end wall 93.

FIG. 5 is a schematic cross-sectional view of the cutting tool 14 illustrated in FIG. 1. Shaft 78 is secured to handle portion 56 and extends through the main housing 58. Flange 80 is also secured to shaft 78 and engages a spring 82 disposed around shaft 78 and placed in between flange 80 and the inner surface of lower housing 60. Spring 82 forces the shaft 78 in an upward direction, as illustrated in FIG. 5. Flange 86 abuts against a surface of lower housing 60 to stop movement of shaft 78 in an upward direction. Lower housing portion 60 fits along the interior surface of housing 58 and can be secured thereto to form a unitary structure. The prong 54 is mounted centrally between the two cutting blades 48 and 50 and extends slightly beyond the length of the cutting blades 48 and 50. Since prong 54 is slightly longer than the cutting blades 48 and 50, the end 55 of prong 54 engages the pipe 12 and penetrates the surface of the pipe 12 prior to the ends 57 of the blades 48 and 50 and prior to the initiation of the cutting action by blades 48 and 50. This causes the residue portion or plug 52 (FIG. 1) to be engaged and maintained by prong 54 so that formation of the hole in the pipe 12 does not produce any residue. Cutting blades 48 and 50 are sufficiently sharp to cut pipe 12 without causing burrs. Spring 82 maintains the cutting blades in a retracted position until the cutting tool is placed in stand connector 16 (FIG. 1) and downward pressure is applied to handle 56. Consequently, the cutting blades 48 and 50 are not exposed except during the actual cutting process in the stand connector 16 where they do not pose a hazard.

The present invention provides a pipe saddle which is extremely reliable in operation by providing seal which can withstand high pressures, will not deteriorate, is locked in place and is in alignment with a hole in the pipe after installation. The barb seal has an oval or elongated shape to ensure greater sealing capability with the pipe. Flanges are provided which have support ribs that transfer pressure to the body portions and maintain a flex tension or spring tension on the seal by a cantilever effect, despite expansion and contraction due to changing temperatures. Protuberances on the flanges shift pressure in an inward direction toward the body portion to maintain pressure on the pipe. Retaining lips prevent unscrewing and sliding off of the T-bolt connectors. The T-bolt connectors allow the pipe saddle to be adapted to different outer diameter pipes and provide for two sided tightening which evenly seals the pipe saddle on the pipe. The T-bolt connectors have a double hinging action which allows faster engagement of the pipe without disassembly of parts. The friction fit of the T-bolt allows the device to be maintained as a single unit. The body portions of the pipe saddle extend beyond the seal a length which is greater than the depression of the pipe caused by kinking. Consequently, leaks will not be induced by kinking or bending of the pipe at the edge of the pipe saddle. The cutting tool of the present invention is spring loaded so that the blades are maintained in a retracted position to reduced hazards and maintain the blades in a sharp condition. The cutting tool is simple and easy to use and provides holes which are residue free.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to their particular use contemplated. It is intended that the appended claims be construed to include other alternative embodiments of the invention except insofar as limited by the prior art.

I claim:

1. A cutting tool primarily intended for forming a hole in a plastic pipe in alignment with a pipe saddle opening of a pipe saddle, said cutting tool including:

handle means extending along a central axis, prong means extending along an axis and mounted to said handle means with the axis of said prong means substantially parallel to and colinear with said central axis of said handle means, said prong means having a pointed end for penetrating said pipe, said pointed end facing in the direction of the axis of said prong means, cutting means including at least one blade member extending along an axis and mounted to said handle means with the axis of said blade member spaced from and substantially parallel to the central axis of said housing means and to the axis of said prong means, said blade member extending about said central axis for a radial angle substantially lss than 180° and said blade member having a knife edge extending along the axis of said blade member and facing in a direction substantially perpendicular to the axis of the blade member wherein said handle means can be manipulated to have the pointed end of the prong means and the blade member penetrate the pipe whereby the handle means can then be rotated about said central axis to radially advance said knife edge through said pipe about said central axis and the axis of said prong means until said knife edge cuts a plug out of said pipe wherein said handle means can thereafter be manipulated away from said pipe with said plug remaining impaled on the prong means, and housing means disposed about said handle means and means for mounting said handle means and prong means and cutting means for movement as a unit relative to said housing means along said central axis, said handle means, prong means, and cutting means being moveable relative to said housing means from a first position exposing said pointed end of said prong means and said knife edge of said blade member beyond said housing means and a second position in which said prong means and cutting means are retracted into said housing means, said housing means including means for abutting and removing said impaled plug from said prong means as said prong means is moved from said first position to said second position.

2. The cutting tool of claim 1 wherein said blade member has a pointed end facing in the direction of the axis of said cutting means to facilitate initial penetration of the blade member into said pipe, said pointed end facing in a direction substantially perpendicular to the facing direction of said knife edge.

3. The cutting tool of claim 1 wherein said blade member extends radially about said central axis for less than 90°.

4. The cutting tool of claim 1 further including means for biasing said handle means in said second position.

* * * * *